June 29, 1937.                R. S. A. DOUGHERTY                2,085,085
                                 REENFORCED TANK
                              Filed Sept. 13, 1933          2 Sheets-Sheet 1

Inventor
R. S. A. Dougherty

June 29, 1937.　　　R. S. A. DOUGHERTY　　　2,085,085
REENFORCED TANK
Filed Sept. 13, 1933　　　2 Sheets-Sheet 2
Fig. 4.
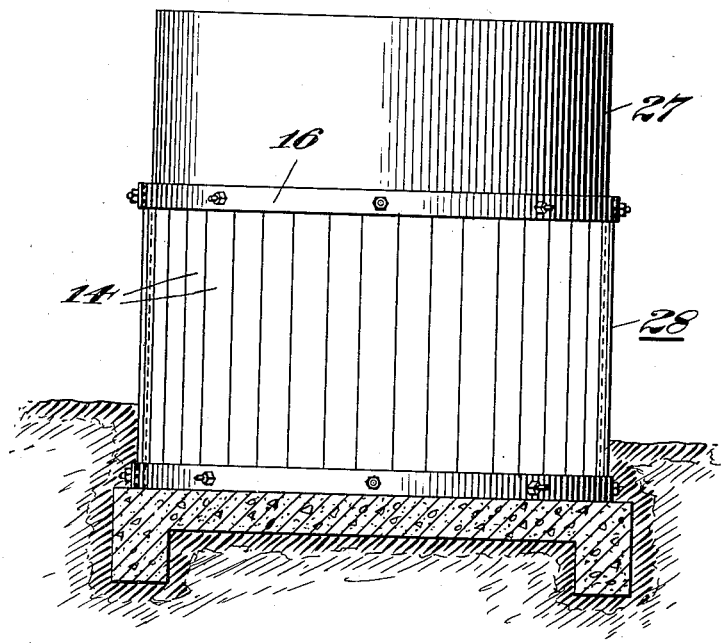
Fig. 5.
Fig. 6.
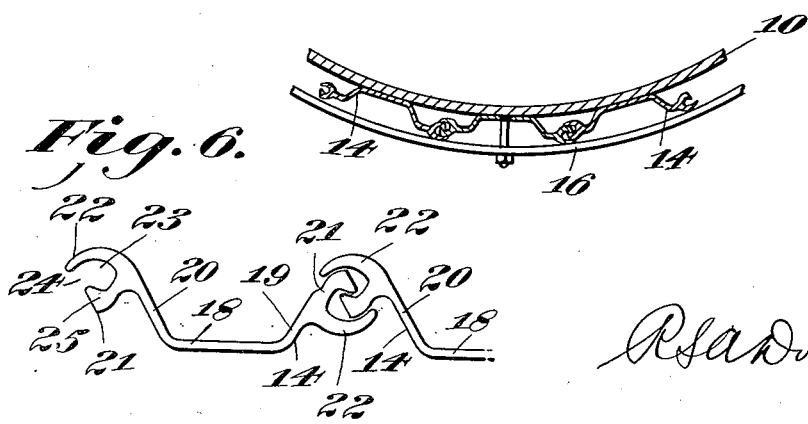
Inventor
R S A Dougherty Patented June 29, 1937

2,085,085

UNITED STATES PATENT OFFICE 2,085,085

REENFORCED TANK

Robert S. A. Dougherty, Bethlehem, Pa., assignor to Bethlehem Steel Company, a corporation of Pennsylvania Application September 13, 1933, Serial No. 689,199

7 Claims. (Cl. 220—71)

My invention relates to storage tanks for storing liquids, such as oil, and more particularly to such storage tanks wherein it is required, or it is found desirable or necessary, to provide supporting strength which is not inherent in the tank structure itself. Such tanks may be those in which due to unusual conditions of convenience, expediency, or matters of cost, the plates of which the tank is constructed are thinner than is safe under the hydrostatic pressures to which the tank may be subjected when in use; or the tank, originally self-supporting, through erosion or other destructive forces may have become so weakened as to require reenforcing in order to be safely continued in use. It is the particular object of my invention to provide suitable means for such reenforcing which will be economical as regards cost of installation and which may be easily and expeditiously assembled either in connection with newly constructed tanks or with those previously constructed and in use.

Tanks used for the storage of oil and other volatile liquids are used extensively in various parts of the world having hot climates and by reason of this fact and the nature of the problem provisions against loss due to evaporation, and the damages incident thereto, have been very costly and troublesome. Also, under certain manufacturing conditions such tanks are unavoidably exposed to heat, either of a constant nature or of a variable nature. The latter condition is probably the more serious in that due to constant expansion and contraction, more or less localized, destructive forces are set up which tend to weaken the tank structure. Again, in tank farms where a large number of tanks are gathered rather closely together, provisions against fire occurring in one tank and affecting others nearby are particularly costly and troublesome. It is another object of my invention to provide insulation means of protecting storage tanks against heat and losses thereby, such means being peculiarly adapted for economical and expeditious installation, either with tanks which have been and are in use or with those being newly erected.

It is the object of my invention to meet the requirements and conditions stated above by means of novel features which will be more fully understood from the following description and claims taken with the drawings in which:

Figs. 3 and 5 are modifications of Fig. 2;

Fig. 4 is a view in elevation of a modification of my invention as applied to an open top tank; and Fig. 6 is an enlarged top view of the interlocked sections which comprise the outer wall structure of my invention.

Figure 1:
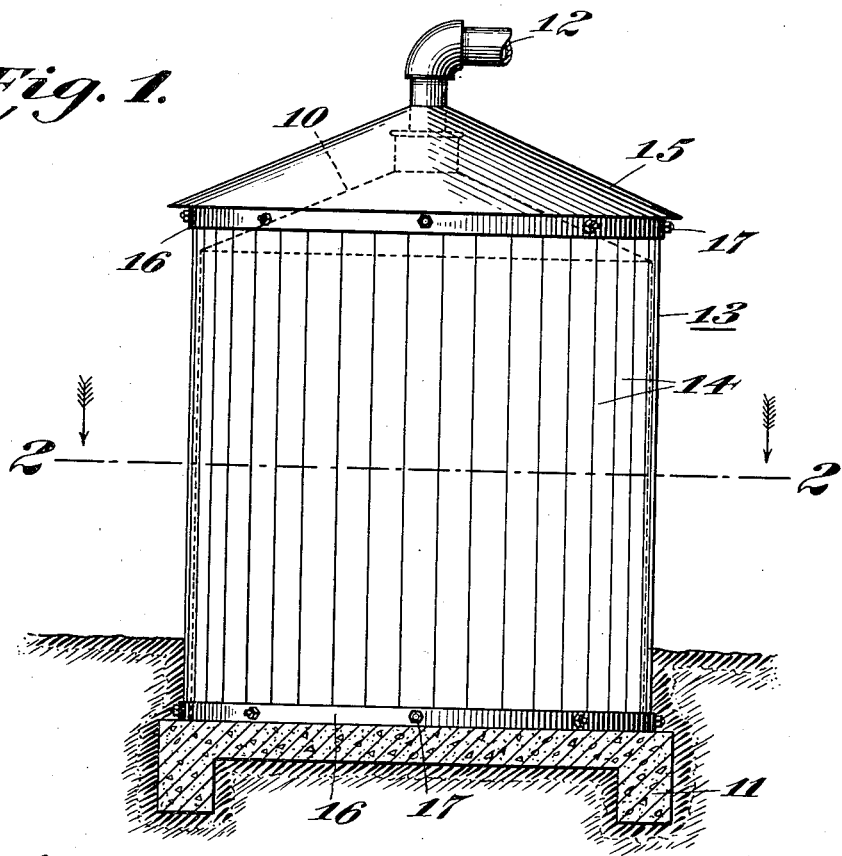
Fig. 1 is a view in elevation of a typical installation of my invention applied to a covered tank.

As illustrated in the accompanying drawings, I have shown in Fig. 1 a storage tank 10 setting upon any suitable foundation 11. The tank 10 is of the closed type in which provision is made for the removal of the gases of evaporation from the top by means of piping 12. The tank 10 is enclosed in a reenforcing structure 13 that embodies my invention. The structure 13 comprises an outer wall constructed of a plurality of interlocking sections 14, an enlarged view of which is shown in Fig. 6, and a suitable roof 15. Bands 16 together with their attaching bolts 17 may or may not be used to form a finish and aligning means for the ends of interlocking sections 14. The bands 16 are not required for purposes of strength.

Any suitable standard interlocking sections 14 may be used in constructing the embodiment of my invention but I prefer to use the type illustrated in Figs. 2, 3, 5 and 6. This type forms the subject matter of U. S. Patent No. 1,806,967, and of which patent I was a co-inventor. This type of interlocking section as clearly shown in Fig. 6 comprises a web portion 18 having inclined sides 19 and 20 each of which is flanged at its outer ends and is provided with a hook-like member 21 and a guard member 22, forming a pocket 23. This pocket 23 extends the full length of the section 14 and has a longitudinal opening 24 which is somewhat less in width than the greatest internal width of the pocket. The hook member 21 is provided with an elongated head 25, which is capable of being inserted in the end of the pocket 23 of an adjoining section. This head 25 is of such a size that it cannot pass through the opening 24 and therefore the sections 14, after assembly, are retained against horizontal displacement. As each side of the sections 14 are provided with a pocket 23 and a head 25, a double lock is obtained and therefore a very strong joint is made between each of the various sections which when assembled completely surround the tank 10.

The sections are assembled by placing the head 25 of each section into the end of the pocket 23 of the adjacent section and sliding one of the sections longitudinally into place, and continuing this procedure until the outer wall of the structure 13 is completed.

Figure 2:
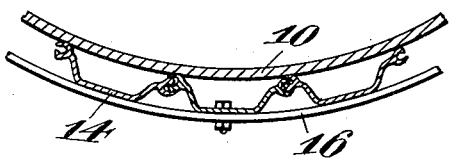
Fig. 2 is an enlarged cross-sectional view taken along part of the line 2—2 of Fig. 1.
Figure 3:
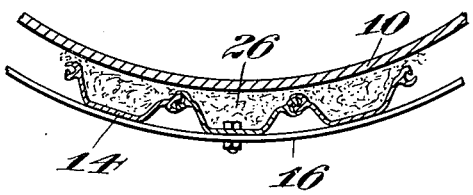

When the embodiment of my invention is primarily intended as a reenforcement with little regard for its insulating features I prefer to assemble the section 14 either as shown in Fig. 2 or Fig. 5. As therein shown the sections 14 are so arranged that they make constantly recurring supporting contact with the tank 10 either by means of the flanged ends or by means of the web portions 18, and as each contact extends full length of the sections and the contacts are comparatively close together a very efficient supporting means is provided for the tank 10. It is true that even in the construction shown in Figs. 2 and 5 considerable insulating effect is provided, but where insulation of the tank 10 against heat is important I prefer to construct my device as shown in Fig. 3. As shown in Fig. 3 the sections 14 forming the outer wall are spaced away from the tank 10 and all the resulting space between the encircling sections 14 and the tank 10 is filled with heat resisting or insulating material 26 such as asbestos fiber or the like. The insulating material 26 may be packed solidly or cast in place and thus act as an intermediate support between the tank and the outer wall structure. The space between the roof of the tank 10 and the roof 15 may also be filled with the same material 26.

The arrangement of the sections 14 shown in Fig. 3 is the same as that shown in Fig. 2. It is obvious that the arrangement of the sections 14 shown in Fig. 5 may be insulated in the same way.

In Fig. 4 I have shown a tank 27 of the open top type which may be either free of any covering or may be provided with a floating-top which floats upon the surface of the liquid contained within the tank. In such a tank (or other tanks for that matter) it may be unnecessary to carry the reenforcing structure 28 to the full height of the tank 27. I have shown therefore how my invention may be applied in such a case. The reenforcing structure 28 is comprised of the sections 14 and is assembled in the same manner, and may be insulated or not, as hereinbefore described for the reenforcing structure 13 of Fig. 1.

In order to dismantle the reenforcing structure it is only necessary to remove the roof and aligning bands, if used, and slide the sections 14 out of engagement with each other until all of the sections have been removed. The ease and expeditiousness with which my reenforcing structure may be assembled or dismantled makes it particularly useful where it is necessary to move from one location to another as occasion demands.

While I have shown my invention in certain preferred forms it will be obvious to those skilled in the art that it is not so limited but is susceptible of other changes and modifications without departing from the spirit thereof and I desire, therefore, that only such limitations shall be placed thereupon, as are imposed by the prior art, or as are specifically set forth in the appended claims.

Having thus described my invention what I claim as new and desire to secure by Letters Patent is:

1. A liquid storage land tank structure comprising a tank having comparatively thin side walls, and an enclosing wall of interlocking rolled steel sheet piling in contact with said tank for the purpose of resisting distortion of said tank due to hydrostatic forces within said tank.

2. A liquid storage land tank structure comprising a tank having comparatively thin side walls, and an enclosing wall of interlocking rolled steel sheet piling each pile of which is in contact with said tank for the purpose of resisting distortion of said tank due to hydrostatic forces within said tank.

3. A liquid storage land tank structure comprising a closed tank having comparatively thin side walls, an enclosing outer structure comprising a roof and an encircling wall of interlocking rolled steel sheet piling, and an insulating filling in the space between the tank and the outer structure whereby the said tank is supported against the action of hydrostatic forces within said tank.

4. A liquid storage land tank structure comprising a tank having comparatively thin side walls, and a plurality of vertically disposed longitudinal rolled metallic sections interlocked at their vertical edges, each section comprising integral interlocks along its vertical edges to form a closed wall for supporting said tank against the action of hydrostatic forces within said tank.

5. In a land tank structure for liquid storage purposes, the combination of vertically disposed, longitudinal metallic wall sections, each section comprising a web and diverging flanged sides, and locking members integral with the flanges of said sides for interlocking said sections together to form a closed wall, and a liquid tight tank enclosed by said closed wall, the said tank having side walls weak with respect to hydrostatic forces within the tank, and the said side walls being supported against said hydrostatic forces by each of said metallic wall sections.

6. In a land tank structure for liquid storage purposes, the combination of vertically disposed, longitudinal metallic wall sections, each section comprising a web and diverging flanged sides, and locking members integral with the flanges of said sides for interlocking said sections together to form a closed wall, and a liquid tight tank enclosed and supported by said closed wall, thereby providing a liquid storage space above ground within said closed wall.

7. A land tank structure for liquid storage purposes, comprising a plurality of longitudinal rolled steel sections to constitute a wall, each section comprising integral interlocks along its vertical edges and being slidably connected to the adjacent section and interlocked against lateral displacement with respect to one another, a liquid tight tank enclosed and supported by said wall, and a foundation supporting said wall and said tank on or near the surface of the ground.

ROBERT S. A. DOUGHERTY.